United States Patent [19]

Ouellette et al.

[11] 4,446,462

[45] May 1, 1984

[54] METHOD AND APPARATUS FOR MULTIPLE FREQUENCY TRANSMISSION OF INFORMATION IN A DIGITAL COMMUNICATION SYSTEM

[75] Inventors: Maurice J. Ouellette, North Berwick, Me.; William C. Hughes, Scotia, N.Y.

[73] Assignee: General Electric Company, Somersworth, N.H.

[21] Appl. No.: 353,501

[22] Filed: Mar. 1, 1982

[51] Int. Cl.³ .................. H04Q 9/00; H04M 11/04; H04B 3/54

[52] U.S. Cl. .................. 340/825.07; 340/870.03; 340/310 R; 455/59

[58] Field of Search .................. 340/825.07, 825.01, 340/825.03, 870.03, 310 R; 375/37; 455/8, 17, 455/53, 59; 371/68; 370/45, 71, 16

[56] References Cited

U.S. PATENT DOCUMENTS

| | | | |
|---|---|---|---|
| 3,944,723 | 3/1976 | Fong | 178/3 |
| 3,973,087 | 8/1976 | Fong | 179/170 R |
| 3,973,240 | 8/1976 | Fong | 340/151 |
| 4,101,834 | 7/1978 | Stutt et al. | 325/42 |
| 4,109,204 | 8/1978 | Kincaid et al. | 325/38 R |
| 4,135,181 | 1/1979 | Bogacki et al. | 340/310 A |
| 4,161,720 | 7/1979 | Bogacki | 340/150 |
| 4,199,761 | 4/1980 | Whyte et al. | 340/310 R |
| 4,245,342 | 1/1981 | Entenman | 340/825.01 |
| 4,254,472 | 3/1981 | Juengel et al. | 340/870.03 |
| 4,307,464 | 12/1981 | Hughes | 375/67 |
| 4,315,251 | 2/1982 | Robinson et al. | 340/310 A |

Primary Examiner—Donald J. Yusko
Attorney, Agent, or Firm—Robert E. Brunson

[57] ABSTRACT

A meter terminal unit, for acquiring information and transmitting the acquired information to a central reading and control unit over utility power transmission lines, includes a transmitter portion for synthesizing and modulating carrier waveforms, the frequencies of which are selectable by command data contained in frequency rotation and address fields of a command received from the central reading and control unit. The meter terminal unit receives and decodes the command and adds, in modulo form, the contents of the frequency rotation field to the contents of a portion of the address field to obtain a resultant sum which uniquely identifies the selected waveform. This sum is used to access a portion of a read only memory (ROM) having the selected waveform stored therein in digital data form. The selected waveform is reconstructed by outputting the digital data from the ROM to a digital to analog converter. The reconstructed carrier waveform is then phase-shift-keyed by the acquired information, which has been placed in digital form, and the resultant modulated carrier is transmitted to the central reading and control unit over the power lines.

21 Claims, 9 Drawing Figures

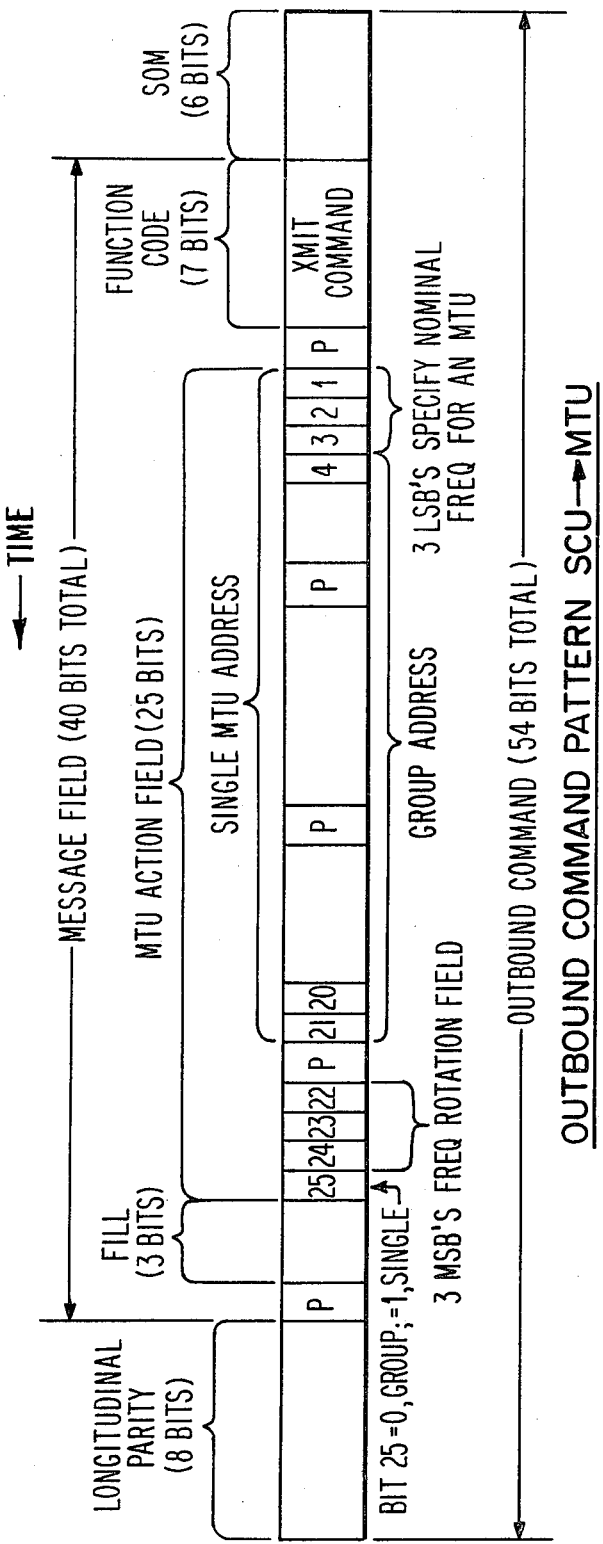
Fig. 3 OUTBOUND COMMAND PATTERN SCU→MTU
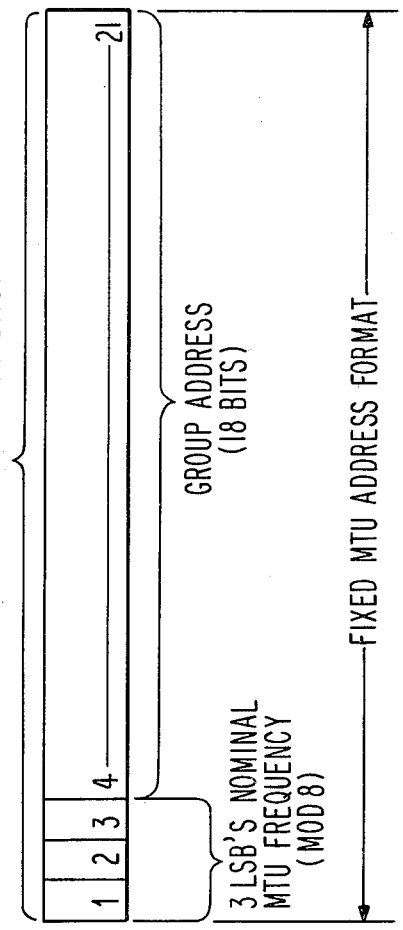
Fig. 4 FIXED MTU ADDRESS FORMAT

METHOD AND APPARATUS FOR MULTIPLE FREQUENCY TRANSMISSION OF INFORMATION IN A DIGITAL COMMUNICATION SYSTEM

BACKGROUND OF THE INVENTION

I. Field of the Invention

This invention relates generally to digital communication systems and more particularly to terminal units for collecting and transmitting data over utility power transmission lines.

II. Description of the Prior Art

Electronic communication systems commonly make use of a carrier frequency which is modulated by the information to be transmitted. For example, information may be transmitted over power lines between a central facility and a multiplicity of remote terminal units, each tied to the power distribution network. Power line communication systems of this type are disclosed and claimed in U.S. Pat. No. 3,973,240, issued Aug. 3, 1976 to Fong; U.S. Pat. No. 3,973,087, issued Aug. 3, 1976 to Fong; U.S. Pat. No. 3,944,723, issued Mar. 16, 1976 to Fong; U.S. Pat. No. 4,135,181, issued Jan. 16, 1979 to Bogacki, et al; U.S. Pat. No. 4,161,720, issued July 17, 1979 to Bogacki; and U.S. Pat. No. 4,315,251, issued Feb. 9, 1982 to Robinson, et al.; all assigned to the assignee of the present application and all incorporated herein by reference in their entirety.

In most power line communication systems, data is gathered and transmitted by remote terminal units to a central receiving and control unit, in response to commands sent by the central unit to the remote unit over the utility power lines. These utility power lines are characterized by networks having many branches, each branch having its own frequency attenuation characteristics which may be quite different from other branches. This implies that the optimum frequency for use on one branch, will not be optimum on some other branch of the system. This also implies that a given branch will work better at one frequency than at another. It has been found that difference in propagation within the frequency band of 5 khz. to 10 khz. can be 20 db or more. In other words, there is usually one best frequency for each remote terminal unit location, and there can be a 20 db. difference between that and the worst frequency, in the 5 to 10 khz. band. Consequently, it can be seen that the use of a single frequency for transmitting data from the remote units to the central receiving and control unit can lead to problems in reliably acquiring information from the remote units.

To overcome the aforementioned transmission difficulties, prior systems have used various frequency assignment plans. Some have used a single compromise frequency for all locations, which may work well at some locations but poorly at others. In other systems, data is encoded in a frequency pattern, requiring that all frequencies work well at a location for that location to operate. Still another system utilizes a frequency multiplexed system wherein a group of remote units, each remote unit within the group having a different assigned frequency, simultaneousls transmit data to the central unit (see the aforementioned U.S. Pat. No. 4,315,251. Although, this system is an improvement over the prior single frequency systems, one must measure the power line frequency attenuation characteristics at each terminal unit location, in order to find the best one of the available frequencies assigned to the group to use at that location, then dedicate that single frequency to that particular remote unit. As can be readily seen, this type of frequency optimization would add costs and complexity to the installation procedure of the remote units as well as requiring a selection of units by frequency at each particular installation. In addition, even after the optimization procedure has been carried out, the frequency attenuation characteristics at a particular site can still change due to the capability possessed by most power companies of switching branches in and out for redistribution of loads within a network; and switching capacitor banks in and out for load factor adjustment. Consequently, even though a particular remote unit is installed on a particular branch, and has been assigned the optimum frequency for that branch at the time of installation, the propagation versus frequency characteristics of that particular branch might still change.

Another problem relating to the reliable transmission of data over power lines is the noise which appears on those lines at random times. Unlike the propagation versus frequency characteristics of the power lines which are uniquely associated with the particular physical and electrical configuration of a transmission line, noise is usually a time related random variable caused by the operation of "noisy" equipment, such as electric motors which are connected to the power distribution network. The noise appears on the network only when the equipment is operated and this operation can take place at any time. This noise can prevent the reliable reception of information transmitted over the power network at either a particular frequency (narrow-band noise) or at many different frequencies simultaneously (broad-band noise).

SUMMARY OF THE INVENTION

In accordance with the present invention, a method and apparatus is provided for minimizing errors in transmitted information attributable to the communications medium through which such information is being transmitted. The invention comprises a meter terminal unit (MTU) including a transmitter portion for transmitting the information at any one of at least two different selectable modulated carrier frequencies over a power distribution network; a receiver portion for receiving commands having at least an address portion and a rotation field portion; and decode means responsive to the address and rotation portions of the received commands to effect the transmission of the modulated carrier at a selected one of the available carrier frequencies.

The MTU receives an outbound command from a reading/control center (RCC) which commands the MTU to transmit information in the form of an inbound message, at a particular frequency, as either a single MTU or as part of a group of MTU's. After receiving the transmitted information, the RCC checks the inbound message for parity. If the received message fails the parity check, the RCC places that particular MTU on a retry list, to be commanded again at a preselected time in the future.

When the preselected time interval has passed, the RCC issues another transmit command to the MTU commanding it to transmit the inbound message at a different frequency. The MTU thereupon transmits the requested inbound message at the commanded frequency and the received message is again checked for parity by the RCC. If the message fails the parity check, the MTU is again placed on the retry list. After a preselected period of time has passed, the RCC will command the MTU to transmit the inbound message at a third frequency. This process repeats until either the message has passed the parity check or the number of available frequencies has been exhausted.

The present invention minimizes errors due to adverse frequency propagation characteristics of the power distribution network, by transmitting the information at different frequencies until the message is received without parity error. In addition, it minimizes errors due to noise induced on the power distribution network equipment connected to the network, since the command to repeat transmission at a different frequency is delayed by a preselected time interval in order to permit the induced noise to subside.

It is, therefore, an overall object of the present invention to provide a method and apparatus for minimizing errors in information transmitted over power distribution networks.

It is another object of the present invention to provide a remote meter terminal unit having the capability to transmit information to a central reading/control center at multiple frequencies, one at a time.

A still further object of the present invention is to provide a remote meter terminal unit which transmits an inbound message to the central reading/control center at a frequency specified in a portion of a transmit command received from the reading/control center.

These and other objects of the present invention will be come apparent from the following more detailed description.

BRIEF DESCRIPTION OF THE DRAWINGS

FIG. 3 is a diagrammatic representation of the preferred pattern of an outbound command from a reading/control center (RCC) to an MTU.

FIG. 4 is a diagrammatic representation of the preferred pattern of a portion of the outbound command depicted in FIG. 3.

DESCRIPTION OF THE PREFERRED EMBODIMENT

Figure 1:
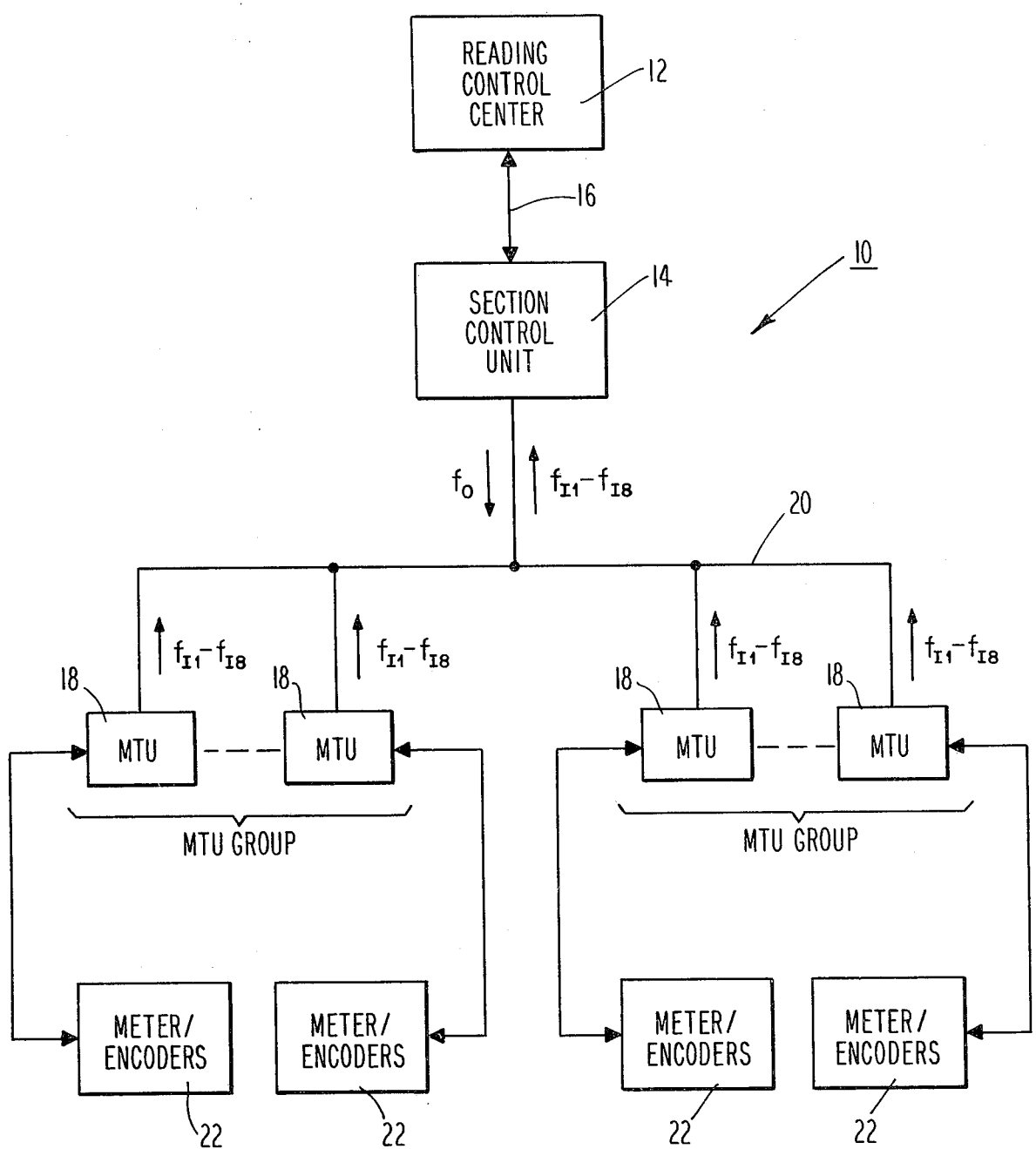
FIG. 1 is a overall block diagram of a power line communication system incorporating meter terminal units (MTU's) in accordance with the present invention.

Referring to FIG. 1 of the drawing, there is shown an overall block diagram of the preferred embodiment of a power distribution line communication system utilizing meter terminal units in accordance with the present invention, the system being generally designated 10. The system 10 comprises a reading/control center (RCC) 12 which communicates with at least one section control unit (SCU) 14 over a first bi-directional communication link 16. The SCU communicates with one or more meter terminal units (MTU's) 18 as required by the system user, which requirements will be adduceable upon reference to U.S. Pat. No. 4,315,251, assigned to the assignee of the present invention. This patent describes the operation of a preferred type of automatic meter reading and control system for utilizing the MTU of the present invention and is incorporated by reference as if fully set forth herein.

The SCU 14 communicates with the MTU's 18 over a second bi-directional communication link 20 which, in the preferred embodiment, is the utility power distribution network. Each MTU 18 has the capability of reading a plurality of meter encoders 22, controlling a plurality of external loads and alerts (not shown), and reporting the status of a plurality of external contacts (not shown) as described in the aforementioned U.S. Pat. No. 4,315,251. Each MTU 18 receives outbound commands from the RCC 12, by way of the SCU 14, over the power line network 20 at a single frequency designated $f_o$. In addition, each MTU is able to transmit inbound messages to the RCC 12, by way of the SCU 14 at one of a plurality of selectable frequencies, of which there are 8 in the preferred embodiment, designated $f_{I1}-f_{I8}$ in FIG. 1. In the preferred embodiment, the assigned frequencies are shown in Table 1.

TABLE 1

| CARRIER | FREQUENCY ($H_z$) |
|---|---|
| $f_0$ (SCU-MTU Outbound) | 5010 |
| $f_{I1}$ (MTU-SCU Inbound) | 6630 |
| $f_{I2}$ | 6990 |
| $f_{I3}$ | 7350 |
| $f_{I4}$ | 7710 |
| $f_{I5}$ | 8130 |
| $f_{I6}$ | 8550 |
| $f_{I7}$ | 9030 |
| $f_{I8}$ | 9510 |

In the preferred embodiment of the system shown in FIG. 1, the MTU's 18 are divided into groups of 8 MTU's each, with each MTU of a paricular assigned group nominally assigned to transmit inbound messages at a frequency which is different than the transmit frequencies of the other MTU's in the group. In other words, one MTU 18 will transmit at frequency $f_{I1}$, another will transmit at $f_{I2}$, a third at $f_{I3}$, etc. In this way, information from all 8 MTU's within a group selected by the RCC 12 can be received by the SCU 14 simultaneously, the inbound messages being transmitted in frequency multiplexed form over the eight inbound frequencies $f_{I1}-f_{I8}$.

Figure 2:
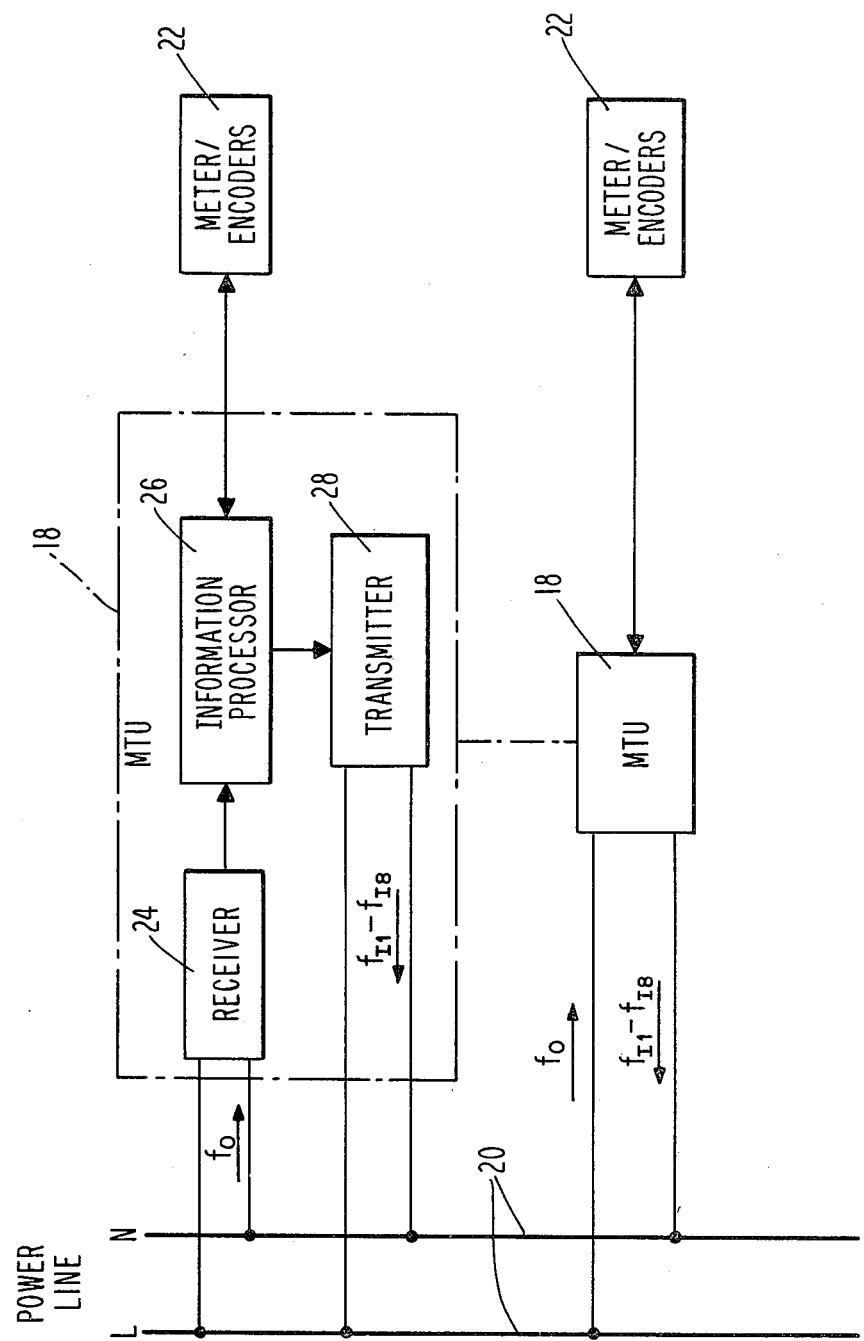
FIG. 2 is a block diagram of an MTU in accordance with the present invention, showing receiver, information processor and transmitter portions of the MTU.

Referring now to FIG. 2, there is shown an MTU 18, in accordance with the present invention, which comprises a receiver 24, electrically connected to the power line 20, for receiving outbound commands from the RCC 12, by way of the SCU 14 over the power line 20 at frequency $f_0$ (see FIG. 1). The receiver 24 demodulates the command from the carrier $f_0$ and outputs that command (outbound received data (OBRD)), as well as receive clock (RC) and a transmit clock (TC) to an information processor 26. In the preferred embodiment, the receiver 24 is a receiver for phase shift modulated carrier signals as shown and described in U.S. Pat. No. 4,298,986, issued Nov. 3, 1981 to Hughes, which receiver preferably incorporates a phase-locked loop stabilized by a crystal oscillator as shown and described in U.S. Pat. No. 4,310,805, issued Jan. 12, 1982 to Hackert, et al., both of which patents are assigned to the assignee of the present invention, and both of which patents are incorporated in this detailed description as fully set forth herein. The information processor 26 reads a plurality of meter encoders 22; controls a plurality of external loads and alerts (not shown); and reports the status of a plurality of external controls (not shown) as described in the aforementioned U.S. Pat. No. 4,315,251. In addition, the information processor outputs control signals and serial data to a transmitter 28, which synthesizes a carrier at a preselected frequency and modulates that carrier with the serial data as will be described hereinafter.

Referring now to FIG. 3, there is shown a diagrammatic representation of the preferred format of the outbound command from the SCU to the MTU. In the preferred embodiment, an outbound command starts with a start of message (SOM) field comprising 6 bits. The contents and role of the SOM field is described in the aforementioned U.S. Pat. No. 4,315,251. Following the SOM field is a function code field comprising seven bits. as described in U.S. Pat. No. 4,315,251, the function code field determines what type of command an addressed MTU will perform. Although, as indicated in the aforementioned Application, there are a number of different types of commands performable by the MTU, the command of interest with respect to the description of the preferred embodiment of the present invention, is the transmit (XMIT) command. The operations performed by the MTU in carrying out this transmit command will be described subsequently.

Following the function code field is a 25 bit MTU action field. The first 21 bits, excluding parity, define a fixed MTU address field. The format of which will be subsequently, described in conjunction with FIG. 4. Bits 22 through 24 of the MTU action field form a frequency rotation field, the function of which is to select a predetermined transmit frequency as will be subsequently described. Bit 25 of the MTU action field signifies whether the transmission will be from a single MTU, or from a group of MTUs simultaneously with the frequencies $f_{f1}$–$f_{f8}$ being multiplexed. The final 8 bits of the outbound command defined the longitudinal parity field, the function of which is described in the aforementioned U.S. Pat. No. 4,315,251.

Referring to FIG. 4, there is shown the preferred fixed MTU address format comprising a 21 bit single MTU address field. The single MTU address field contains address information which uniquely addressed a selected one of the MTU's in the system. As shown in FIG. 4, the single MTU address field may be broken down into a group address field, comprising bits 4 through 21, which contains group address information which uniquely addresses a selected one of the groups of MTUs in the system; and a 3 bit field, comprising the three LSB's 1 through 3, which uniquely identifies a particular MTU within a group. As previously stated, in the preferred embodiment of the present invention, these 3 bits not only uniquely identify a particular MTU within the group addressed by bits 4 through 21, it also defines the nominal frequency assigned to that particular MTU, which is one of 8 frequencies available to the MTU's within the group.

Figure 5:
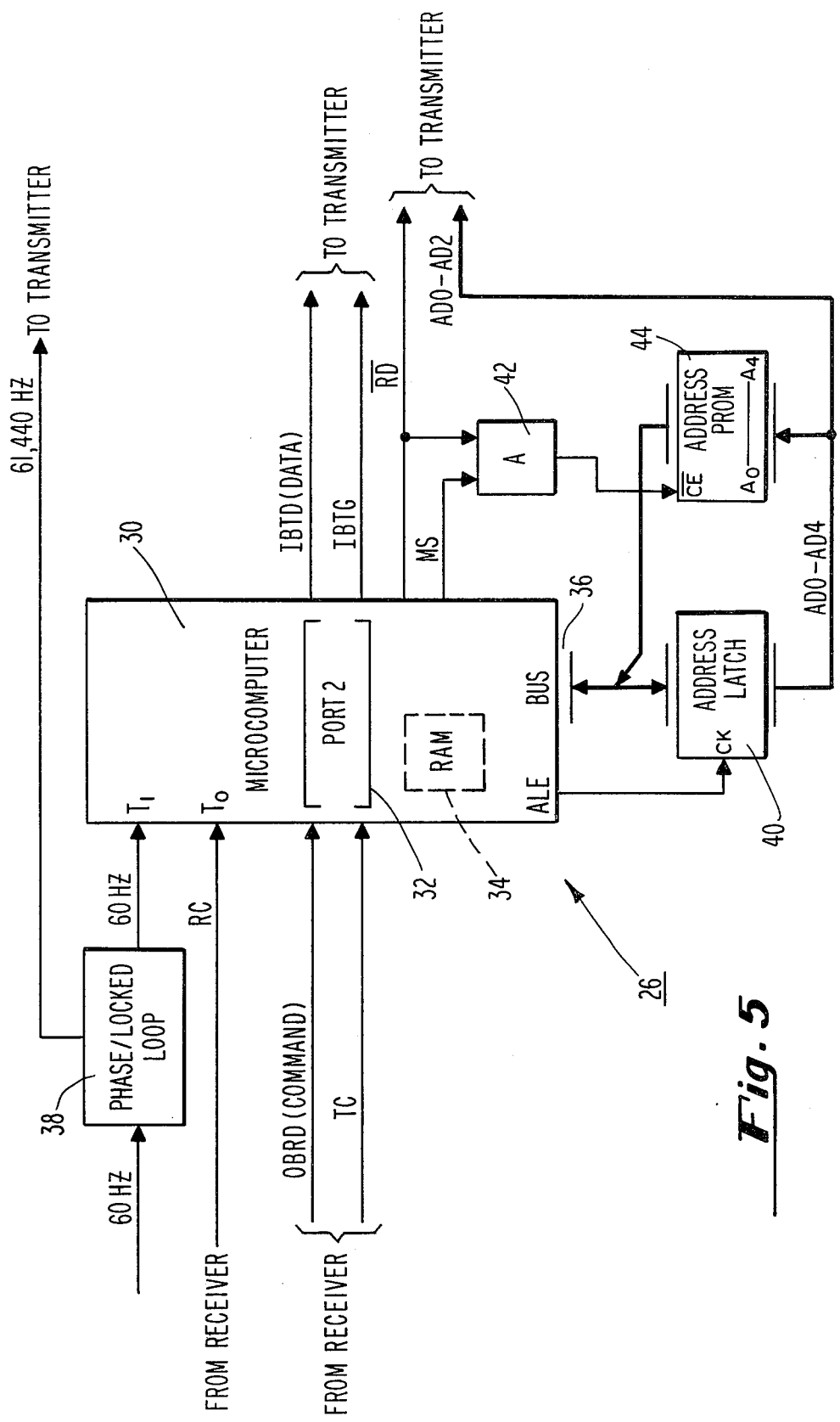
FIG. 5 is a block diagram of a preferred embodiment of the information processor portion of the MTU in accordance with the present invention.

Referring now to FIG. 5, there is shown a block diagram of the information processor portion 26 of the MTU 18 of the present invention. The information processor 26 comprises a microcomputer 30, which in the preferred embodiment is an Intel Corp. Model 8049 microcomputer, as shown and described in the aforementioned U.S. Pat. No. 4,315,251. The microcomputer 30 incorporates an 8 bit quasi-bidirectional port (PORT 2) 32; an internal random access memory (RAM) 34; an 8 bit bi-directional port (BUS) 36; as well as various clock, enable and strobe signals, all of which are shown and described in the Intel Corp. publication entitled, "MCS-48 TM Family of Single Chip Microcomputers Users Manual", published July, 1978 by the Intel Corp., 3065 Bowers Avenue, Santa Clara, Calif. This publication describes the architecture and operation of the type 8049 microcomputer and is incorporated by reference in this detailed description as if fully set forth herein.

A phase locked loop circuit 38, of the type shown and described in U.S. Pat. No. 4,310,805, previously referenced and incorporated herein, receives a 60 $H_z$ input signal from the power line 20 (see FIG. 2). The output of the phase locked loop circuit 38 is a 60 $H_z$ square wave which is sychronized to the 60 $H_z$ signal present on the power feeder line. The 60 $H_z$ square wave signal is input to the T1 input pin which is designated an event counter input for the microcomputer 30 and is described in the previously referenced "Users Manual". Input pin (T0) receives the receive clock (RC) strobe from the receiver portion 24 of the MTU, which is used by the microcomputer 30 when receiving data from the receiver portion 24 as shown and described in the aforementioned U.S. Pat. No. 4,315,251. The phase locked loop circuit 38 also provides a 61,440 $H_z$ signal to the transmitter 28.

Two terminals of PORT 2 are electrically connected to the receiver portion 24 for enabling the microcomputer 30 to receive the outbound received data (OBRD) (command) signal and the transmit clock (TC) signal from the receiver portion 24. Two other terminals of PORT 2 are electrically connected to the transmitter 28 thereby enabling the microcomputer 30 to provide an inbound transmit data (IBTD) signal and an inbound transmit gate (IBTG) signal to the transmitter 28. The eight terminals of the bi-directional port (BUS) 36, are electrically connected to an address latch circuit 40 which receives and stores address information which is output from the microcomputer 30. The address latch circuit 40 preferably comprises eight flip-flops such as included in a pair of Texas Instruments type LS175's. An address latch enable (ALE) terminal of the microcomputer 30 is electrically connected to a clock input (CK) of the address latch circuit 40 to enable the computer to control the latching of the address latch circuit 40 as described in the U.S. Pat. No. 4,315,251, previously mentioned.

A read ($\overline{RD}$) terminal of the microcomputer 30 is electrically connected to one input of a gating circuit (A) 42 as well as to the transmitter portion 28. It should be noted at this point th the read ($\overline{RD}$) terminal is also connected to other components of the meter terminal unit as shown and described in the aforementioned U.S. Pat. No. 4,315,251. However, for purposes of simplicity in this description and since these other components are not directly pertinent to the present invention, they will not be shown and described in the present application. The signal appearing on this line ($\overline{RD}$) is an output strobe which is activated during a BUS read and is described in the microcomputer "Users Manual".

An address programable read only memory (PROM) 44 stores data in locations as shown and described in the aforementioned U.S. Pat. No. 4,315,251. The address PROM 44 receives an enable signal ($\overline{CE}$) from the gating circuit 42 upon coincidence of the read strobe ($\overline{RD}$)

and a memory select (MS), at which time the contents of the addressed location of the addressed PROM 44 is read into the microcomputer 30 through the BUS port 36. The address PROM 44 is addressed by bits 0 through 4 (AD0–AD4) of the address output by the address latch circuit 40. Note that bits 0 through 4 (AD0–AD4) are also coupled to the transmitter 28 to be used by the transmitter 28 as will be subsequently described. The address PROM 44 is preferably an Monolithic Memories Model No. 5331.

Figure 6:
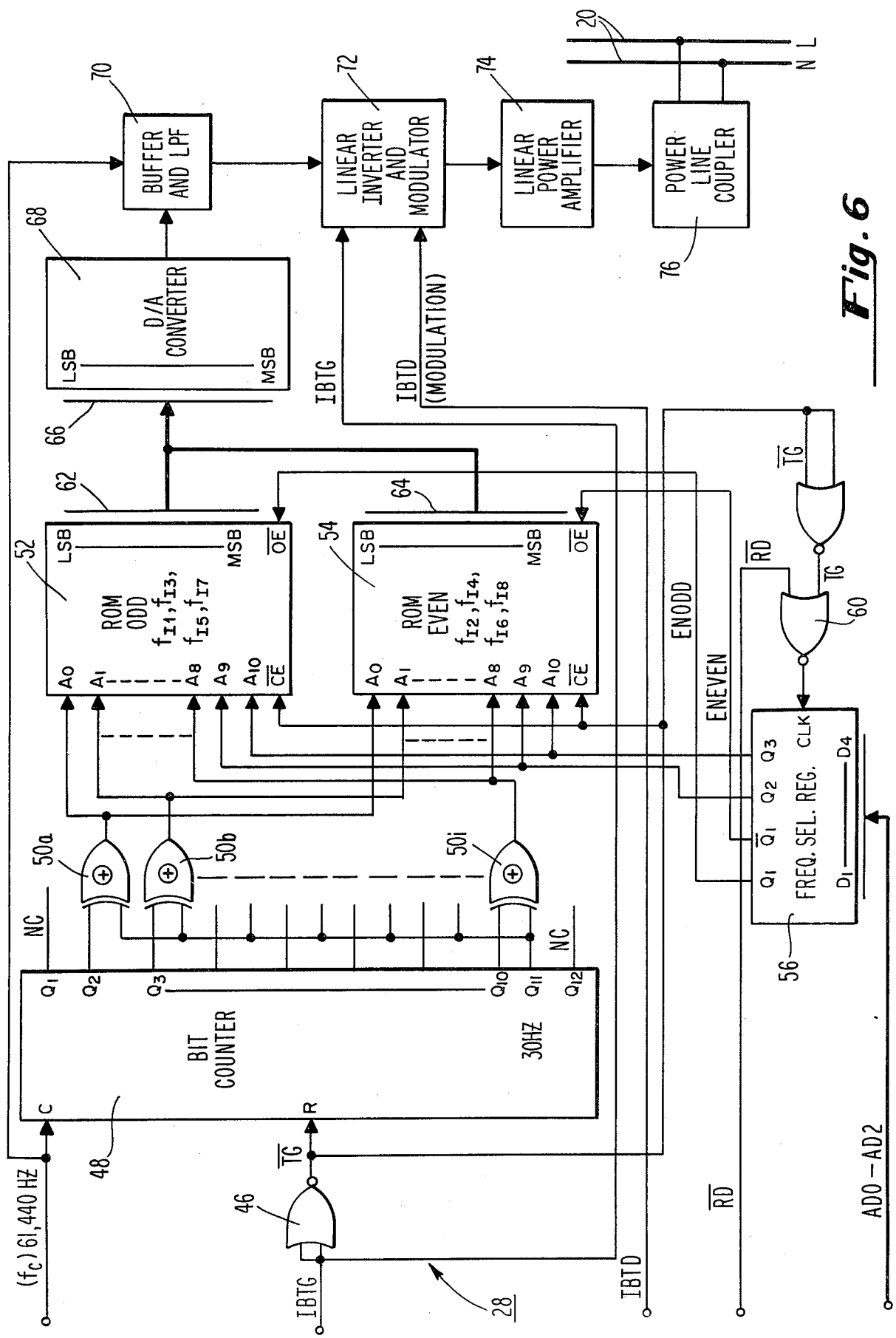
FIG. 6 is a block diagram of a preferred embodiment of the transmitter portion of the MTU in accordance with the present invention.

Referring now to FIG. 6, there is shown a block diagram of the preferred embodiment of the transmitter portion 28 of the MTU 18 of the present invention. The output of a first logic inverter 46 is electrically connected to the reset input (R) of a 12 stage bit counter 48. In the preferred embodiment, the first logic inverter 46 is an RCA type CD 4001UB two input NOR gate, with both inputs electrically connected together thereby causing the NOR gate to function as an inverter, shown and described in the RCA COS/MOS Integrated Circuits Data Book, SSD-250, 1977; and the 12 stage bit counter is an RCA type CD4040B COS/MOS Ripple-Carry Binary Counter/Divider, which is shown and described in the aforementioned RCA Data Book. The inbound transmit gate (IBTG) signal from the microcomputer 30 is connected to the input of the first logic inverter 46; consequently, the output ($\overline{TG}$), of invertor 46 is the logical inverse of IBTG. The 61,440 $H_z$ clock ($f_c$) signal from the phase-locked loop circuit 38 is coupled to the clock input (C) of the bit counter 48. The outputs from stages Q2 through Q10 are electrically connected to a first input of two input exclusive OR gates 50a through 50i respectively. In the preferred embodiment, the exclusive OR gates 50a through 50i CD4070B COS/MOS Quad Exclusive-OR Gates, as shown and described in the aforementioned RCA Data Book. The output from stage Q11 of the bit counter 48 is electrically connected to each one of the second inputs of exclusive OR gates 50a through 50i. The output of exclusive OR gate 50a is coupled to input A0 of a first read only memory (ROM) 52 and also to input A0 of a second ROM 54. In the preferred embodiment, the ROMs 52 and 54 are Motorola Type MCM 2716 2048 X B-BIT UV Eraseable PROMS as shown and described in the Motorola Memory Data Manual, 1980. Likewise, the output of exclusive OR gate 50b is coupled to input A1 of the first and second ROMs 52 and 54. Similarly, the outputs of exclusive OR gates 50c through 50i are coupled respectively to inputs A2 through A8 of both the first 52 and second 54 ROMS.

Bits 0 through 2 (AD0–AD2) of the address output by the address latch circuit 40 are coupled to inputs D1, D2 and D3 respectively of a frequency select register 56. In addition, bit 3 (AD2) is also connected to input D4 of frequency select register 56. In the preferred embodiment, the frequency select register 56 is a National Semiconductor type CD4017B Quad D Flip-Flop as shown and described in the National Semiconductor CMOS Data Book. The Q1 output of the frequency select register 56 is coupled to the $\overline{OE}$ input of the first ROM 52. The $\overline{Q1}$ output of the frequency select register 56 is coupled to the $\overline{OE}$ input of the second ROM 54. The Q1 output of the frequency select register 56 is a signal which will be hereinafter referred to as enable odd (ENODD) while the $\overline{Q1}$ output is a signal hereinafter referred to as enable even (ENEVEN). Output Q2 of the frequency select register 56 is coupled to inputs A9 of the first and second ROMs 52 and 54. Output Q3 of the frequency select register 56 is coupled to inputs A10 of the first and second ROMs 52 and 54. The output ($\overline{TG}$) of the first inverter 46, in addition to being coupled to the reset (R) input of the bit counter 48, is coupled to the $\overline{CE}$ input of both the first 52 and second 54 ROMs, as well as to the input of a second logic inverter 58. In the preferred embodiment, the second logic inverter 58 is an RCA type CD4001UB two input NOR gate, with both inputs electrically connected together thereby causing the NOR gate to function as an inverter. The output (TG) of the second inverter 58, which output is the logical inverse of the input ($\overline{TG}$), is coupled to one input of a two input NOR gate 60 which, in the preferred embodiment is also an RCA type CD4001UB two input NOR gate. The $\overline{RD}$ output of the microcomputer 30, is coupled to the other input of the two input NOR gate 60. The output of NOR gate 60 is coupled to the clock (CLK) input of the frequency select register 56.

A multi-line output port 62 of the first ROM 52 and a multi-line output port 64 of the second ROM 54, are electrically connected to a multi-line input port 66 of an eight bit digital to analog (D/A) converter 68. In the preferred embodiment, the eight bit (D/A) converter 68 is a Motorola type MC1508 Eight Bit Multiplying Digital-to-Analog Converter, as shown and described in the Motorola Linear Inteface Integrated Circuits Data Book, 1979. The output ports 62 and 64 of the first 52 and second 54 ROMs output digital data contained at the address location selected by address bits input to terminals A0 through A10. The least significant bit (LSB) of the data output from each of the ROM's 52 and 54 is coupled to the LSB input of D to A converter 68. The remainder of the bits of the ROM outputs, in increasing order of significance through the most significant bit (MSB), are respectively coupled to the input in ascending order of significance, of the D to A converter 68.

The analog output of the digital to analog (D/A) converter 68 is electrically connected to an analog data input of a sample and hold portion of a buffer and low pass filter network 70. The 61,440 $H_z$ clock ($f_c$) is electrically connected to a control signal input of the sample and hold portion. The output of the buffer and low pass filter network 70, which represents a selected one of the frequencies $f_{I1}$–$f_{I8}$ in the preferred embodiment, as will be subsequently described, is electrically connected to a signal input of a linear inverter and modulator network 72. The inbound transmit gate (IBTG) signal from the microcomputer 30 is electrically connected to a gate input of the linear inverter and modulator circuit 72. The inbound transmit data (IBTD) signal from the microcomputer 30 is electrically connected to a modulation input of the linear inverter and modulator network 72 and provides the carrier modulation information as will be subsequently described. The output of the linear inverter and modulator circuit, representing a modulated carrier having a selected one of the available frequencies $f_{I1}$–$fI_8$, is connected to the power distribution network 20 through a linear power amplifier 74 and a power line coupler 76.

Figure 7:
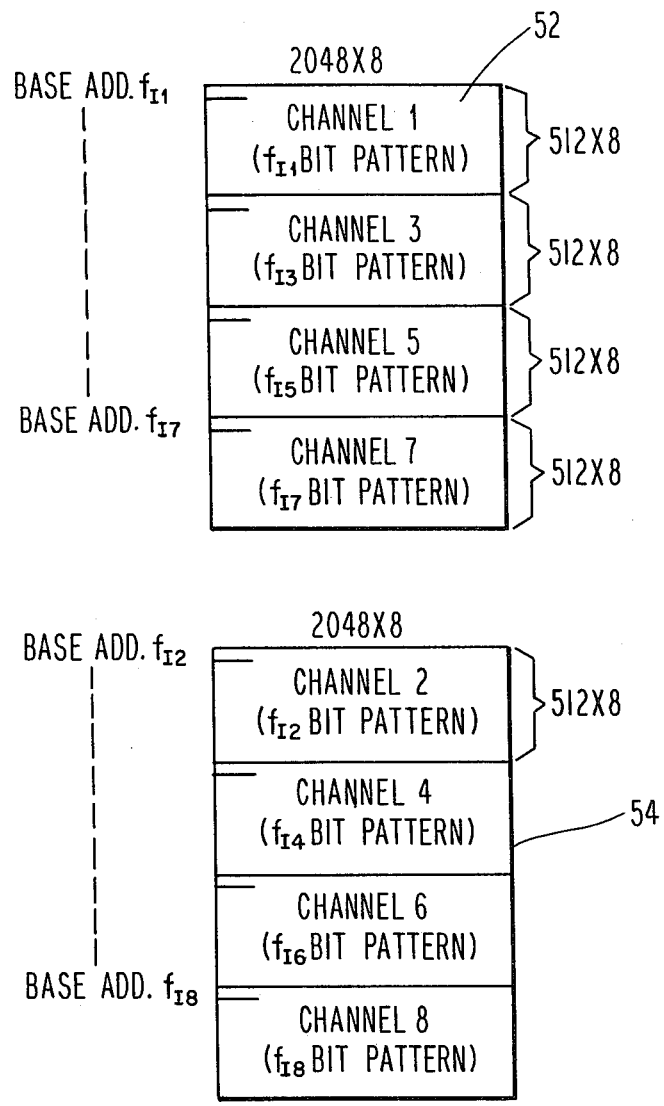
FIG. 7 is a memory map of a read only memory (ROM) portion of the transmitter portion of the MTU in accordance with the present invention.

Referring now to FIG. 7, there is shown memory maps for the first ROM 52 and the second ROM 54. Each ROM has a 2048X 8 bit array of memory. Frequency bit patterns are stored in each memory array as depicted in FIG. 7. As previously stated, there are eight available frequencies, $f_{I1}$–$f_{I8}$. In the preferred embodiment, there are 512 eight bit data entries defining each frequency bit pattern. The frequency bit patterns are stored in the ROM's by odd and even channels as shown in FIG. 7. Channel 1 requires 512 eight bit memory locations as does channel 3, 5 and 7 in the first ROM 52. Likewise, channels 2, 4, 6 and 8 each have 512 eight bit memory locations reserved in the second ROM 54.

The digital data are used to synthesize each of the eight frequencies, as described in U.S. Pat. No. 4,307,464, issued to Hughes on Dec. 22, 1981, and assigned to the assignee of the present invention, and which patent is incorporated herein by reference in its entirety. As shown and described in the aforementioned patent, each frequency is synthesized by a preselected number of data points during each bit time interval (T). The number of data points in the preferred embodiment of the present invention, is 1024. This is accomplished using only 512 eight bit memory locations because of the symmetry of the wave form about the mid point of the bit time interval T. This particular method of wave form synthesis is shown and described in the aforementioned U.S. Pat. No. 4,307,464, which has been herein by reference in its entirety.

Figure 8:
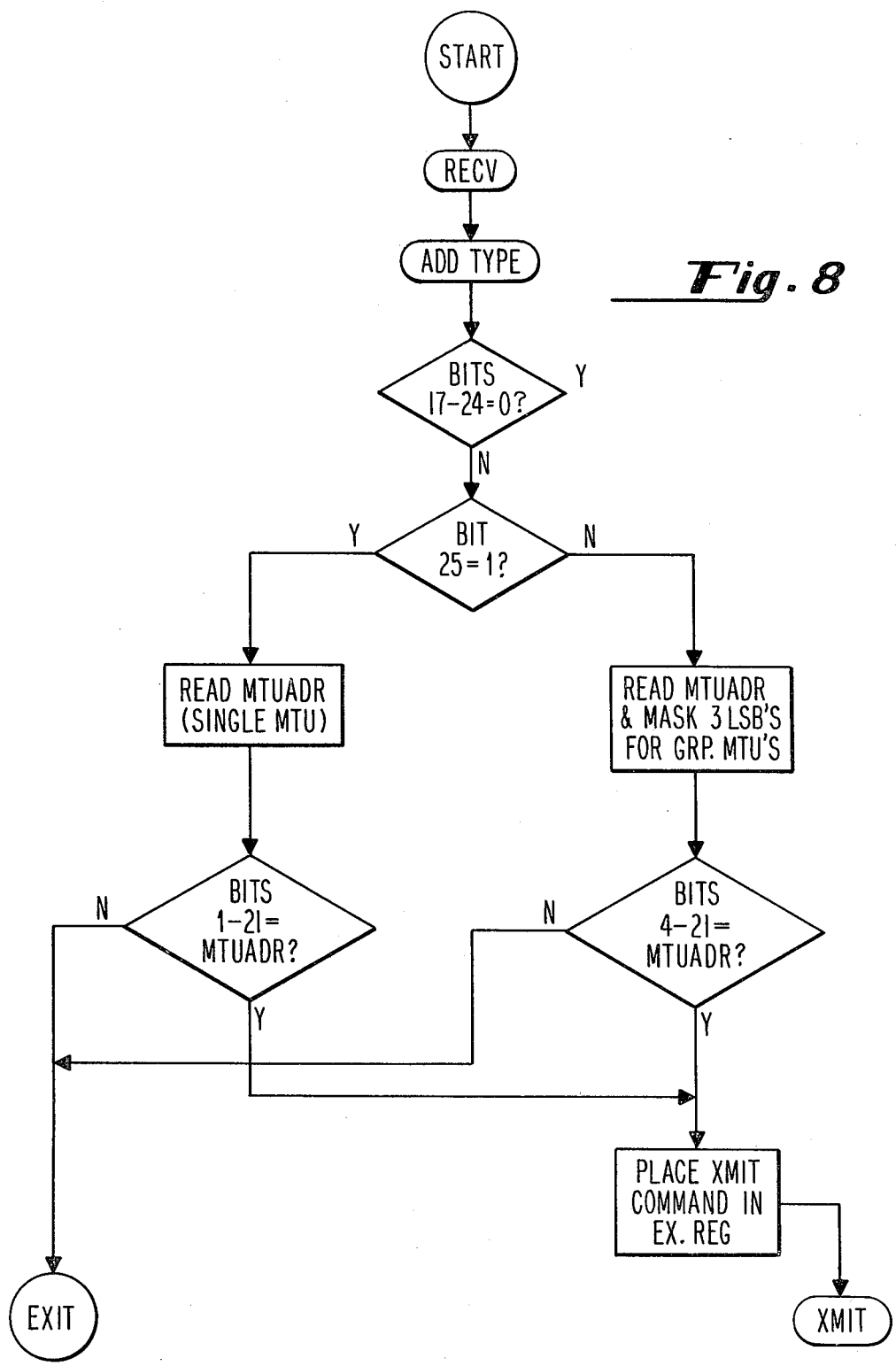
FIGS. 8 and 9 are flow charts describing the operation of the MTU in receiving and acting upon a transmit command from the RCC.

FIG. 8 depicts the steps of the methods by which the MTU receives a command, determines whether or not the command is a group command or a single MTU command, and determines whether the command is addressed to it or to a group to which it belongs. As shown in FIG. 8, the MTU will perform the steps of the method designated RECV, by which the MTU obtains and stores the information contained in an outbound command. This method is described in detail in conjunction with FIG. 15 of the aforementioned U.S. Pat. No. 4,315,251 which has been incorporated herein by reference in its entirety.

Upon completion of the steps of RECV, the MTU will perform the steps of the method designated ADDTYPE, to determine whether the command is one of three block types, a group type or a single type, as described in the aforementioned U.S. Pat. No. 4,315,251, and whether the received command is intended for this particular MTU. The microcomputer 30 first tests bits 17 through 24 of the MTU action field of the received outbound command (see FIG. 3) to determine whether or not they are zero. If bits 17 through 24 are zero, this is either an illegal transmit command or not a transmit command at all, as described in the aforementioned U.S. Pat. No. 4,315,251 in conjunction with FIG. 16 thereof. In any event, since the MTU will not perform a transmit function if bits 17 through 24 are equal zero, no further description of that branch of the ADDTYPE flow diagram is necessary with respect to the present invention.

IF bits 17 through 24 are not zero, this indicates that the received command is a single our group type command, either of which may contain a valid transmit function as described in the aforementioned U.S. Pat. No. 4,315,251. The microcomputer 30 then tests bit 25 to determine whether or not it is a "1". If bit 25 is not a "1" (which signifies a group type command), bits 1 through 3 are masked, that is they are ignored and bits 4 through 21 are compared with the contents of the MTUADR location in the address PROM 44. If there is no match, this particular MTU has not received a valid group address and will exit this method to await further commands. If there is a match, the command contained in the function code field of the outbound command message (see FIG. 3), will be placed in the EXREG location of the microprocessor internal RAM, as described in the aforementioned U.S. Pat. No. 4,315,251. As previously stated, for the purposes of the description of the present invention, it will be assumed that the command contained in the function code field is a transmit (XMIT) command. Consequently, the XMIT command will be placed in the EXREG location of the microprocessor RAM. The MTU will then execute the XMIT command.

Figure 9:
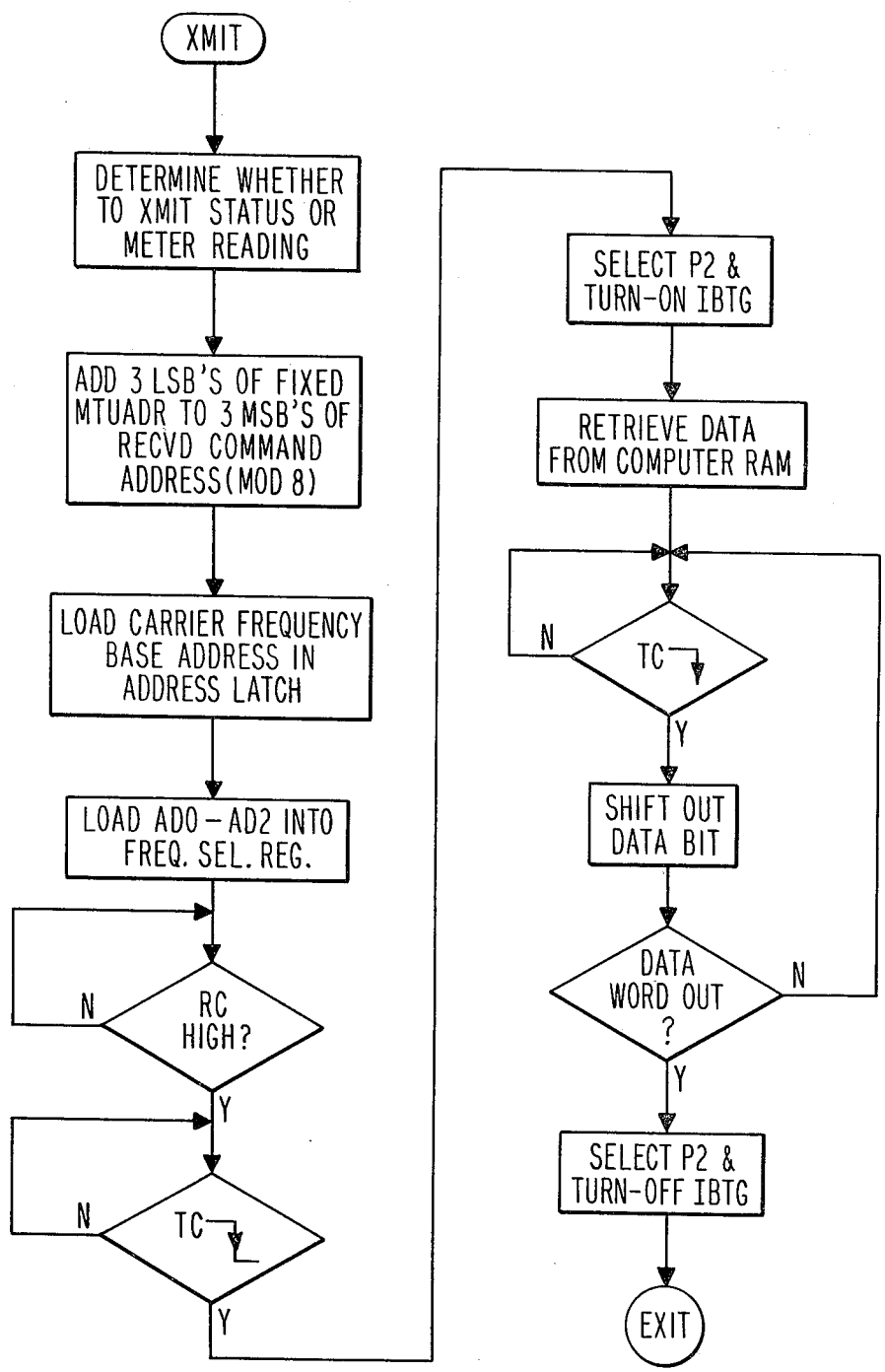

Referring to FIG. 9, there is shown the steps of the transmit (XMIT) subroutine. The microprocessor will first determine whether the command is to transmit status or a designated meter reading. The steps of this determination are described in the aforementioned U.S. Pat. No. 4,315,251 with reference to FIG. 23. The microprocessor then sets up the carrier frequency base address, in order to determine which of the eight frequencies the MTU is to transmit on, by adding the three least significant bits (LSB's) of the fixed MTUADR stored in the address PROM 44, to the three bits in the frequency rotation field of the received command, modulo 8. The resulting carrier frequency base addresss is then loaded into the address latch 40 at locations AD0–AD2. AD0–AD2 are then loaded into the frequency select register 56 of the transmitter portion 28. Next, the receive clock (RC) will be tested to determine its level. If not high, the microcomputer 30 will wait until RC becomes high. Waiting for RC to go high is necessary in order to synchronize the transmission with respect to the first transmit clock (TC) following RC since, as described in the aforementioned U.S. Pat. No. 4,315,251, the SCU expects an immediate receipt of message upon sending to the MTU and execute immediate transmit command.

The microprocessor will then wait until TC makes a transition from high to low, whereupon the microcomputer then selects PORT 2 and turns on the inbound transmit gate (IBTG) in order to shift out the first start of message (SOM) bit. After all SOM bits have been shifted out, the microcomputer 30 will retrieve the data to be transmitted then wait for TC to make the transition from high to low, at which time the first data bit will be shifted out. The microcomputer 30 will then test to see whether an entire data word has been shifted. If not, it will go back and wait for TC to go from high to low at which time it will shift out the next data bit. This will continue until the entire data word has been shifted out at which time PORT 2 is selected and IBTG is turned off. The transmit subroutine has now been completed and the microcomputer will then proceed to other operations.

The carrier frequency base address, which has been loaded as bits AD0–AD2 into the frequency select register 56, is used to select one of the eight frequency bit patterns stored in the ROM's 52 and 54 as follows. In the preferred embodiment, output Q1 of the frequency select register 56 is the logical equivalent of the AD0 bit; and $\overline{Q}$, is the logical inverse of the AD0 bit. Similarly Q2 is the equivalent of AD1 and Q3 is the equivalent of AD2. As shown in FIG. 6, an output at Q1 is coupled to the output enable ($\overline{OE}$) input of the first ROM 52; thereby enabling the output of the odd numbered frequency bit patterns stored in the first ROM 52. Likewise, an output at $\overline{Q1}$ enables, by way of the output enable ($\overline{OE}$) input of the second ROM 54, the output of the even numbered frequency bit patterns stored in that ROM 54. Assuming one or the other ROMS have been selected, the outputs at Q2 and Q3 select one of the four frequency bit pattern areas located within the selected ROM. Assume for the purposes of this description, that the channel 1 ($f_{l1}$) bit pattern area of the first ROM 52 is to be selected by AD0–AD2 and the proper values are present on these address lines as previously described. The three bits are then loaded into register 56 and thereby applied to the first and second ROMS, 52 and 54, from outputs $Q_1$, $\overline{Q_1}$, $Q_2$ and $Q_3$ by the output of the NOR gate 60, which output will transfer positive when both the read signal ($\overline{RD}$) and the inbound transmit gate signal (IBTG) are not present. Consequently, new data appearing at $Q_1$–$Q_3$ of the frequency select register 56 will be loaded into register 56 and made available to the ROMs 52 and 54 only during a period when there is neither a BUS read by the microcomputer 30 nor a shifting out of inbound data, as enabled by IBTG. Note: refer to the aforementioned U.S. Pat. No. 4,315,251 for timing sequences of $\overline{RD}$ and IBTG.

As previously stated, the inbound transmit gate (IBTG) signal is connected to the reset input of the bit counter 48 through a first logic inverter 46. Consequently, when IBTG is turned off, the bit counter 48 is initialized to a zero count and when IBTG is turned on, the counter begins to count under control of the 61,440 hz input clock. Thus, the counter is counting while inbound data (IBTD) is being shifted out of the microcomputer 30. The outputs $Q_2$–$Q_{10}$ comprise a 9 bit binary number for addressing 512 eight bit memory locations in each of the first 52 and second 54 ROM's. This is accomplished by coupling the outputs $Q_2$ through $Q_{10}$ to the address inputs A0 through A8 of the ROMS 52 and 54 through exclusive OR gates 50a through 50i. Consequently, when the inbound transmit gate (IBTG) is turned on, outputs $Q_2$ through $Q_{10}$ of the bit counter 48 begin counting from their initialized 0 value (000000000) up through and including 111111111, under control of the input clock $f_c$. With $Q_{10}$ being equal to the MSB of the 9-bit binary number, and having a bit rate equal to 60 Hz (61,440÷1024=60), the outputs $Q_2$–$Q_{10}$ will count to 512 in binary (000000000 to 111111111) 60 times a second. In the preferred embodiment, the baud rate of the inbound data is 30 bits per second, therefore, the outputs $Q_2$–$Q_{10}$ will count to 512 twice during each bit period.

As previously stated, each output $Q_2$–$Q_{10}$ is coupled to one input of a two input exclusive OR gate, the other input of each being coupled to the output of $Q_{11}$ which has a bit rate of 30 Hz (61,440÷by 2048=30). The characteristic of an exclusive OR gate is such that one input functions as an inverter whereby, when that input is high, the output is the inverse of the other input. That is, for $A \oplus B = C$, when $A = 0$, $C = B$ and when $A = 1$, $C = \overline{B}$. In view of this, one can use this characteristic of the exclusive OR to construct an up-down counter by simultaneously changing the state of the signal appearing at the other input of each of the two input exclusive OR gates 50a–50i after the up count has been completed. Therefore, the outputs of the exclusive OR gates 50a–50i will count from 000000000 to 111111111 (0 to 511) in the first half of the bit period T and then from 111111111 to 000000000 (511 to 0) in the second half of the bit period during which time output $Q_{11}$ has changed states from 0 to 1. In otherwords, the outputs $Q_2$–$Q_{10}$ will count from 0 to 511 in binary, twice during each bit period, and since $Q_{11}$ has a bit rate of 30 Hz, meaning that $Q_{11}$ changes from 0 to 1 midway during each bit period, the outputs from the exclusive OR gates will count from 0 to 511 then from 511 to 0 during each bit period.

As previously stated, the outputs from the exclusive OR gates address locations of data stored in the ROMS 52 and 54. As assumed for purposes of this description, the outputs of the exclusive OR gates 50a–50i will address that portion of the first ROM 52 containing the channel 1 ($f_{11}$) bit pattern as shown in FIG. 7. During the first half of the bit interval (T), all 512 eight bit memory locations containing the channel 1 bit pattern will be addressed; and during the second half of the bit interval T, these locations will again be addressed in the reverse order. Taking advantage of the symmetry of the wave form about the mid point of a bit interval, it is possible to synthesize 1024 data points of the output wave form using only 512 eight bit memory locations. As previously stated, this procedure is shown and described in the aforementioned U.S. Pat. No. 4,307,464 which is incorporated herein by reference in its entirety.

As each of the 512 eight bit locations in the selected portion of the ROM is addressed, the ROM will output the eight bit data located at that address, in parallel form, to the input 66 of a digital to analog (D/A) converter 68. The D/A converter will output an analog voltage level corresponding to the digital value contained in the addressed location to a sample and hold input of the buffer and low pass filter network 70. The sample and hold portion of the buffer and low pass filter network 70, operates under the control of the 61,440 Hz clock ($f_c$) which causes the sample and hold to sample and hold new data 1024 times during each bit interval T (1/30 sec. in the preferred embodiment). Consequently, the waveform input to the low pass filter portion of the buffer and low pass filter network 70 is a predetermined sequence of analog values which approximate the selected carrier frequency. This signal is then passed through the low pass filter portion of the network 70 in order to remove the high frequency components and smooth the synthesized waveform. In the preferred embodiment, the synthesized waveforms have amplitude-symmetric envelopes which decrease in amplitude at each data transition of the type shown and described in U.S. Pat. No. 4,307,464 which has been incorporated by reference herein in its entirety.

The smooth waveform is then input to the linear inverter and modulator 72. The linear inverter and modulator 72 has a modulation input for receiving the serial binary data bit stream IBTD from the microcomputer 30. The appearance of a binary logic level transition, either positive-going or negative-going, at the modulation input causes the linear inverter to invert the signal appearing at its output, with respect to the phase of the signal appearing at the output immediately prior to a particular bit stream transition. Thus, each bit stream transition, indicative of a change in binary value from the previous bit, inverts the sythesized carrier frequency wave form in a format commonly known as 180° differential phase shift modulation. To effect this carrier modulation in the preferred embodiment of the present invention, the IBTD signal controls a digitally controlled analog switch, preferably an RCA type 4053B Triple 2-Channel COS/MOS Analog Multiplexer/Demultiplexer. A digital control input selects one of two inputs which are connected to an output in a signal-pole double throw configuration. This digital input is the modulation input to the linear inverter and modulator 72 of the preferred embodiment.

A "0" waveform, output from the low pass filter portion of the buffer and low pass filter network 70 is coupled to one input of the digitally controlled analog switch. A "180°" waveform, which in the preferred embodiment is the "0" waveform passed through the linear inverter portion of the linear inverter and modulator network 72, is coupled to the second input of the switch. A transition in logic level of the IBTD signal applied to the digital control input of the digitally controlled analog switch causes the carrier waveform appearing at the switch output to switch from the 0° waveform to the 180° waveform, or vice versa depending upon the sequence of logic state transition (i.e. 0 to 1 or 1 to 0). The carrier waveform appearing at the switch output is then amplified by the linear power amplifier 74 and coupled onto the power line 20 by the power line coupler 76 for transmission over the power line to a receiving location. In the preferred embodiment, the linear power amplifier 74 is a two stage amplifier with the first stage providing signal level voltage gain and the second stage for voltage and power gain. The amplifier features thermal protection and current limiting and presents a high impedance to the line when not enabled; this latter feature being provided by using the $\overline{TG}$ signal to drive a relay whose contacts isolate the bases of complementary output transistors during those times when the tansmitter is not enabled. Also in the preferred embodiment, the power line coupling network is a series resin circuit of an inductor connected between the output of the transistor and ground and a series capacity connected between the output and the power line 20.

As previously described, an outbound command transmitted by the RCC 12 to the MTU's 18 by way of the SCU 14, will contain two fields, the three LSB's of the single MTU address and the frequency rotation field, which relate to the frequency of the carrier waveform to be synthesized and sent back to the RCC 12 by way of the SCU 14. In operation of a utility meter reading and control system incorporating an MTU in accordance with the present invention, the RCC 12 will check the inbound messages from the MTU's for parity. If the inbound message of a particular MTU does not pass the parity check, that particular MTU, or the group to which that MTU belongs, will be placed on a retry list to be retried at a later time and at another frequency. Consequently, when it is time to perform the retry, the RCC will send an outbound command having the new frequency information contained in the frequency rotation field. The MTU, after receiving this transmit command, will once again add the contents of the frequency rotation field, modulo 8, to the 3 LSB's of the single MTU address field in the outbound command as previously described. The resulting sum corresponds to the new transmit carrier frequency, and the MTU will then transmit the requested information using this new carrier frequency. The RCC will again check parity of the received message, placing the MTU, or group of MTU's, on the retry list for subsequent commanding if correct parity was not detected. This process will continue until either correct parity is detected or until all available transmit frequencies have been used, or until all available time is used.

As stated above, it is possible, in the preferred embodiment of the present invention, to retry the entire group of eight MTU's simultaneously, since each MTU of the group nominally transmits at a different one of the eight available frequencies. When commanding a group retry, the RCC will set bit 25 of the MTU action field of the outbound command equal to zero (see FIG. 3). Each MTU of the addressed group will add, modulo 8, the same three bits in the frequency rotation field (which specifies the new transmit carrier frequency), to the three LSB's of its single MTU address field. Since each MTU of the group is assigned a different nominal transmit frequency, uniquely identified by the three LSB's in the single MTU address field of each, adding the constant contained in the frequency rotation field in the outbound command, modulo 8, to the three LSB's of each single MTU address field, will result in the eight available transmit frequencies being re-assigned to the eight MTU's comprising the group.

The use of an MTU having the capability of synthesizing carrier waveforms at a plurality of frequencies and transmitting information using a selectable one of these frequencies, minimizes errors in the transmitted information caused by frequency related propagation deficiencies inherent in the power distribution network. As previously stated, each network usually has its own unique propagation versus frequency characteristics wherein there can be as great as a 20 db difference in attenuation between the best and worst frequencies in the 5 $Kh_z$ to 10 $KH_z$ band. It should be noted that the rate of change of propagation (or attenuation) of a signal as a function of frequency changes relatively gradually in a power distribution network; consequently, it is preferred that the information placed in the frequency rotation field of the outbound retry command, cause the MTU to transmit at a frequency which is at least three removed from the previous transmit frequency. For example, if the previous frequency was $f_{f1}$, the new frequency will be $f_{f4}$. Likewise, if the previous frequency was $f_{f7}$, the new frequency will be $f_{f2}$ (modulo 8). Also in the preferred embodiment, the retry time is programmable and is usually about 30 minutes, in order to compensate for any spurious and temporary noise which has been introduced on to the transmission lines by the operation of machinery, etc. This programmed delay in retry allows time for the noise generating apparatus to cease operation or be removed from the network. It can, therefore, be seen from the above description, that the method and apparatus of the present invention will reduce errors adducable to the power line characteristic and thereby increase the reliability of the information received by the RCC.

While the principles of the invention have now been made clear in an illustrative embodiment, there will be immediately obvious to those skilled in the art, many modifications of structure, arrangement, the elements, material, and components used in the practice of the invention and otherwise, which are particularly adapted for specific environments and operation requirements without departing from those principles. The appended claims are, therefore, intended to cover and embrace any such modifications within the limits only of the true spirit and scope of the invention.

What is claimed is:

1. In an apparatus for for transmitting information, in the form of a modulated carrier frequency, through a communications medium in response to a received command, a method of minimizing errors in said information attributable to said communications medium, said method comprising the steps of:

a. providing means for transmitting said information using any one of at least two different selectable carrier frequencies;

b. transmitting said information at a first carrier frequency, selectable by a portion of a first received command; then c. transmitting said information using at least one other carrier frequency; selectable by a portion of at least one additional received command.

2. The method in accordance with claim 1 wherein step (a) comprises providing means for synthesizing at least two digitaldata-modulated carrier waveforms, said digital data being a sequence of binary data bits each having one of first and second binary data values, and each said carrier waveform being phase-shift-key modulated by said binary data.

3. The method in accordance with claim 2 wherein step (b) comprises transmitting said information using a first carrier frequency selectable by data contained in a portion of an address field portion of said received command, which data uniquely identifies said first carrier frequency.

4. The method in accordance with claim 3 wherein step (c) comprises transmitting said information using a second carrier frequency selectable by data which uniquely identifies said first carrier frequency, and which is contained in said portion of the address field portion of said additional received command, and data which is uniquely related to said other carrier frequency, and which is contained in a rotation field portion of said additional received command.

5. The method in accordance with claim 4 wherein step (c) comprises the steps of:
   i adding in modulo form, the contents of said frequency rotation field to the contents of the portion of said address field to obtain a resultant sum;
   ii synthesizing a carrier waveform having a frequency which is different than said first carrier frequency and which is uniquely identified by said resultant sum;
   iii modulating said synthesized carrier waveform with said information; and
   iv transmitting said modulated carrier to a using apparatus.

6. The method in accordance with claim 5 wherein step (a) comprises providing means for transmitting said information using any one of eight different selectable carrier frequencies.

7. An apparatus for transmitting information in the form of a modulated carrier frequency in response to a received command, said apparatus comprising:
   a. means for transmitting said information using any one of at least two different selectable carrier frequencies;
   b. means for receiving a command having at least an address field portion and a frequency rotation field portion; and
   c. decode means responsive to said received command for effecting the transmission of said modulated carrier at one of said carrier frequencies selected by command data contained in said address and frequency rotation fields of said received command.

8. An apparatus in accordance with claim 7 wherein said information transmitting means comprises means for synthesizing at least two digital-data-modulated carrier waveforms, said digital data being a sequence of binary data bits each having one of first and second binary data values, and each carrier waveform being phase-shift-key modulated by said binary data.

9. An apparatus in accordance with claim 8 wherein said decode means comprises means for adding, in modulo form, the contents of said frequency rotation field to the contents of a portion of said address field to obtain a resultant sum which uniquely identifies one of said carrier frequencies; and means for applying said resultant sum to said information transmitting means.

10. A remote automatic utility monitoring and control system including a terminal unit connected to a power line, said terminal unit comprising:
    a. means for transmitting information in the form of a modulated carrier having a selectable one of at least two different frequencies;
    b. means for receiving a command having at least an address field portion and a frequency rotation field portion; and
    c. decode means responsive to said received command for effecting the transmission of said modulated carrier at one of said carrier frequencies, selected by command data contained in said address and frequency rotation field portions of said received command.

11. A terminal unit in accordance with claim 10 wherein said information transmitting means comprises means for synthesizing at least two digital-data-modulated carrier waveforms, said digital data being a sequence of binary data bits each having one of first and second binary data values, and each carrier waveform being phase-shift-key modulated by said binary data.

12. A terminal unit in accordance with claim 11 wherein said decode means comprises means for adding, in modulo form, the contents of said frequency rotation field to the contents of a portion of said address field to obtain a resultant sum which uniquely identifies said selected carrier frequency, and means for applying said resultant sum to said information transmitting means.

13. A remote automatic utility monitoring and control system including a group of terminal units connected to a power distribution network, said group including at least two terminal units, each terminal unit comprising:
    a. means for transmitting information in the form of a modulated carrier having a selectable one of an assigned nominal carrier frequency which is different from the nominal carrier frequencies assigned to the other terminal units comprising said group and at least one additional carrier frequency which is different from said assigned nominal carrier frequency, the number of said additional carrier frequencies being equal to the number of said terminal units comprising said group, minus 1; and each of said additional carrier frequencies being equal to a different one of the nominal carrier frequencies assigned to the other terminal units comprising said groups;
    b. means for receiving a command having at least an address field portion and a frequency rotation field portion; and
    c. decode means responsive to said received commands for effecting the transmission of said modulated carrier at one of said carrier frequencies selected by command data contained in said address and frequency rotation field portions of said received command.

14. A terminal unit in accordance with claim 13 wherein said transmitting means comprises means for synthesizing at least two digital-data-modulated carrier waveforms, said digital data being a sequence of binary data bits each having one of first and second binary data values, and each carrier waveform being phase-shift-key modulated by said binary data.

15. A terminal unit in accordance with claim 14 wherein said decode means comprises means for adding, in modulo form, the contents of said frequency rotation field to the contents of a portion of said address field to obtain a resultant sum which uniquely identifies said selected carrier frequency, and means for applying said resultant sum to said information transmitting means.

16. In a remote automatic utility monitoring and control system including a remote terminal unit for acquiring information and transmitting said acquired information, in the form of a modulated carrier frequency, to a central reading and control unit over a power distribution network, in response to a command from said control unit, a method of minimizing errors in said information attributable to said power distribution network, said method comprising the steps of:
   a. providing means for transmitting said information using any one of at least two different selectable carrier frequencies;
   b. transmitting said information at a first carrier frequency, selectable by a portion of a first received command; then
   c. transmitting said information using at least one other carrier frequency, selectable by a portion of at least one additional received command.

17. The method in accordance with claim 16 wherein step (a) comprises means for synthesizing at least two digital-datamodulated carrier waveforms, said digital data being a sequence of binary data bits each having one of first and second binary data values, and each carrier waveform being phase-shift-key modulated by said binary data.

18. The method in accordance with claim 17 wherein step (b) comprises transmitting said information using a first carrier frequency selectable by data contained in a portion of an address field portion of said received command, which data uniquely identifies said first carrier frequency.

19. The method in accordance with claim 18 wherein step (c) comprises transmitting said information using a second carrier frequency selectable by data which uniquely identifies said first carrier frequency, and which is contained in said portion of the address field portion of said additional received command, and data which is uniquely related to said other carrier frequency, and which is contained in a rotation field portion of said additional received command.

20. The method in accordance with claim 19 wherein step (c) comprises the steps of:
   i adding, in modulo form, the contents of said frequency rotation field to the contents of the portion of said address field to obtain a resultant sum;
   ii synthesizing a carrier waveform having a frequency which is different than said first carrier frequency and which is uniquely identified by said resultant sum;
   iii modulating said synthesize carrier waveform with said information; and
   iv transmitting said modulated carrier to a using apparatus.

21. The method in accordance with claim 20 wherein step (a) comprises means for transmitting said information using any one of eight different selectable carrier frequencies.

* * * * *